(12) United States Patent
Hassan et al.

(10) Patent No.: US 9,544,777 B2
(45) Date of Patent: Jan. 10, 2017

(54) WHITE SPACE UTILIZATION

(75) Inventors: Amer A. Hassan, Kirkland, WA (US);
Daniel A. Reed, Redmond, WA (US);
Paul W. Garnett, Albany, NY (US);
Billy Anders, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 450 days.

(21) Appl. No.: 13/564,727

(22) Filed: Aug. 2, 2012

(65) Prior Publication Data
US 2013/0337741 A1 Dec. 19, 2013

Related U.S. Application Data

(63) Continuation-in-part of application No. 13/525,370, filed on Jun. 18, 2012.

(51) Int. Cl.
| | | |
|---|---|---|
| *H04W 16/14* | (2009.01) | |
| *H04W 64/00* | (2009.01) | |
| *H04W 76/02* | (2009.01) | |
| *H04W 72/04* | (2009.01) | |
| *H04W 74/00* | (2009.01) | |
| *H04W 4/02* | (2009.01) | |
| *H04W 12/08* | (2009.01) | |

(52) U.S. Cl.
CPC ............ *H04W 16/14* (2013.01); *H04W 4/025* (2013.01); *H04W 12/08* (2013.01); *H04W 64/00* (2013.01); *H04W 72/044* (2013.01); *H04W 74/002* (2013.01); *H04W 76/023* (2013.01)

(58) Field of Classification Search
CPC ...... H04W 16/14; H04W 12/08; H04W 4/025; H04W 74/002
USPC ................................................. 455/501, 509
See application file for complete search history.

(56) References Cited

U.S. PATENT DOCUMENTS

| | | | |
|---|---|---|---|
| 6,304,756 B1 | 10/2001 | Hebeler et al. | |
| 6,567,665 B1 | 5/2003 | Kissee | |

(Continued)

FOREIGN PATENT DOCUMENTS

| | | |
|---|---|---|
| CN | 1887023 A | 12/2006 |
| EP | 1740001 A1 | 1/2007 |

(Continued)

OTHER PUBLICATIONS

Shellhammer, et al., "Technical Challenges for Cognitive Radio in the TV White Space Spectrum", Retrieved at <<http://ita.ucsd.edu/workshop/09/files/paper/paper_1500.pdf>>, Information Theory and Applications Workshop, 2009, Feb. 8, 2009, pp. 323-333.

(Continued)

*Primary Examiner* — Gennadiy Tsvey
(74) *Attorney, Agent, or Firm* — Steve Wight; Sandy Swain; Micky Minhas

(57) ABSTRACT

The concepts relate to broadcasting white space utilization. One example can interact with a wireless device that is configured to obtain authorization to use a set of radio white space frequencies in accordance with one or more constraints. The example can obtain an individual radio white space frequency and associated individual constraints. This example can also utilize the individual radio white space frequency for network access independent from the wireless device that is configured to obtain the authorization.

20 Claims, 11 Drawing Sheets

(56) References Cited

U.S. PATENT DOCUMENTS

| | | | |
|---|---|---|---|
| 7,013,158 B1 | 3/2006 | Cook | |
| 7,876,786 B2 | 1/2011 | Bahl et al. | |
| 8,185,120 B2 | 5/2012 | Hassan et al. | |
| 8,311,548 B2* | 11/2012 | Zumsteg | G01S 5/021 455/446 |
| 8,437,790 B1 | 5/2013 | Hassan et al. | |
| 8,467,359 B2 | 6/2013 | McCann et al. | |
| 8,483,155 B1 | 7/2013 | Bannerjea et al. | |
| 8,507,293 B2 | 8/2013 | Ward et al. | |
| 8,588,158 B2 | 11/2013 | Kim et al. | |
| 8,605,741 B2 | 12/2013 | Kim et al. | |
| 8,767,763 B2 | 7/2014 | Kim et al. | |
| 9,014,738 B2 | 4/2015 | Gebert | |
| 9,025,536 B2 | 5/2015 | Krishnaswamy | |
| 2001/0048746 A1 | 12/2001 | Dooley | |
| 2002/0036989 A1* | 3/2002 | Payton | 370/254 |
| 2002/0107709 A1* | 8/2002 | Colson et al. | 705/7 |
| 2002/0107811 A1* | 8/2002 | Jain et al. | 705/64 |
| 2004/0043772 A1 | 3/2004 | Quirke et al. | |
| 2004/0248585 A1 | 12/2004 | Karacaoglu | |
| 2004/0259546 A1 | 12/2004 | Balachandran et al. | |
| 2007/0275730 A1 | 11/2007 | Bienas et al. | |
| 2008/0036647 A1* | 2/2008 | Jung | G01S 11/06 342/118 |
| 2008/0113787 A1* | 5/2008 | Alderucci et al. | 463/29 |
| 2008/0130519 A1 | 6/2008 | Bahl et al. | |
| 2009/0061892 A1 | 3/2009 | Lee et al. | |
| 2009/0083800 A1 | 3/2009 | Puthalapat et al. | |
| 2009/0144791 A1 | 6/2009 | Huffman et al. | |
| 2009/0181621 A1* | 7/2009 | Kimura | H04W 52/283 455/69 |
| 2009/0196180 A1 | 8/2009 | Bahl et al. | |
| 2009/0243796 A1* | 10/2009 | Tieman | B60R 25/24 340/5.72 |
| 2009/0247201 A1 | 10/2009 | Ye et al. | |
| 2010/0048234 A1 | 2/2010 | Singh | |
| 2010/0136994 A1 | 6/2010 | Kim et al. | |
| 2010/0309806 A1 | 12/2010 | Wu et al. | |
| 2010/0328139 A1* | 12/2010 | Iwasaki | G01S 1/024 342/47 |
| 2011/0014936 A1* | 1/2011 | Kim | H04W 24/10 455/509 |
| 2011/0039495 A1* | 2/2011 | Sawai | H04W 52/16 455/62 |
| 2011/0059701 A1* | 3/2011 | Fujii | H04W 72/02 455/69 |
| 2011/0076959 A1 | 3/2011 | Selen et al. | |
| 2011/0080882 A1 | 4/2011 | Shu et al. | |
| 2011/0090887 A1 | 4/2011 | Kim et al. | |
| 2011/0096770 A1 | 4/2011 | Henry | |
| 2011/0164186 A1 | 7/2011 | Sadek et al. | |
| 2011/0164580 A1 | 7/2011 | Keon | |
| 2011/0182257 A1 | 7/2011 | Raveendran et al. | |
| 2011/0205910 A1 | 8/2011 | Soomro et al. | |
| 2011/0223877 A1 | 9/2011 | Tillman et al. | |
| 2011/0223931 A1* | 9/2011 | Buer | G01S 5/12 455/456.1 |
| 2011/0228666 A1 | 9/2011 | Barbieri et al. | |
| 2011/0237238 A1 | 9/2011 | Hassan et al. | |
| 2011/0243078 A1* | 10/2011 | Kim | H04W 72/0426 370/329 |
| 2011/0264780 A1 | 10/2011 | Reunamaki et al. | |
| 2011/0287802 A1 | 11/2011 | Ma et al. | |
| 2011/0299481 A1* | 12/2011 | Kim et al. | 370/329 |
| 2011/0299509 A1 | 12/2011 | Wang et al. | |
| 2011/0306375 A1 | 12/2011 | Chandra et al. | |
| 2011/0307612 A1 | 12/2011 | Junell et al. | |
| 2011/0310865 A1 | 12/2011 | Kennedy et al. | |
| 2011/0319129 A1 | 12/2011 | Bhat et al. | |
| 2012/0052891 A1 | 3/2012 | Irnich et al. | |
| 2012/0094681 A1 | 4/2012 | Freda et al. | |
| 2012/0120892 A1 | 5/2012 | Freda et al. | |
| 2012/0122477 A1* | 5/2012 | Sadek | H04W 16/14 455/456.1 |
| 2012/0148068 A1 | 6/2012 | Chandra et al. | |
| 2012/0182883 A1 | 7/2012 | Junell et al. | |
| 2012/0195230 A1* | 8/2012 | Monzat de Saint Julien | H04W 72/0453 370/254 |
| 2012/0230250 A1 | 9/2012 | Kasslin et al. | |
| 2012/0238304 A1 | 9/2012 | Lambert et al. | |
| 2012/0281594 A1 | 11/2012 | Stewart et al. | |
| 2012/0300761 A1 | 11/2012 | Vasko et al. | |
| 2012/0307685 A1 | 12/2012 | Kim et al. | |
| 2013/0039212 A1* | 2/2013 | Li | H04W 52/0245 370/253 |
| 2013/0070605 A1 | 3/2013 | Ghosh et al. | |
| 2013/0114480 A1* | 5/2013 | Chapman | H04L 5/1469 370/282 |
| 2013/0195096 A1 | 8/2013 | Kim et al. | |
| 2013/0204677 A1 | 8/2013 | Wang et al. | |
| 2013/0223357 A1 | 8/2013 | Jones et al. | |
| 2014/0066059 A1 | 3/2014 | Patil et al. | |
| 2014/0146723 A1 | 5/2014 | Chang | |
| 2015/0119059 A1 | 4/2015 | Miao et al. | |
| 2016/0081014 A1 | 3/2016 | Hassan et al. | |

FOREIGN PATENT DOCUMENTS

| | | | |
|---|---|---|---|
| EP | 2224771 A1 | 9/2010 | |
| GB | 2477916 A | 8/2011 | |
| GB | 2492967 A | 1/2013 | |
| WO | 2006/117587 A1 | 11/2006 | |
| WO | 2010/022156 A2 | 2/2010 | |
| WO | 2010/108439 A1 | 9/2010 | |
| WO | 2011/062722 A1 | 5/2011 | |
| WO | 2011053078 A2 | 5/2011 | |
| WO | 2012035190 A1 | 3/2012 | |
| WO | 2012087694 A1 | 6/2012 | |
| WO | 2012/118490 A1 | 9/2012 | |
| WO | 20120125631 A1 | 9/2012 | |
| WO | 2012171456 A2 | 12/2012 | |
| WO | 2012174152 A2 | 12/2012 | |

OTHER PUBLICATIONS

Viola, Catherine, "TV white spaces: a new option for smart grid communications?", Retrieved at <<http://www.smartgridopinions.com/article/tv-white-spaces-new-option-smart-grid-communications>>, Sep. 27, 2011, pp. 09-27.

Fazeli-Dehkordy, et al., "Wide-Band Collaborative Spectrum Search Strategy for Cognitive Radio Networks", Retrieved at <<http://ieeexplore.ieee.org/stamp/stamp.jsp?arnumber=05765552>>, Proceedings of IEEE Transactions on Signal Processing, vol. 59, No. 8, Aug. 2011, pp. 3903-3914.

Wang, et al., "Channel Assignment of Cooperative Spectrum Sensing in Multi-Channel Cognitive Radio Networks", Retrieved at <<http://ieeexplore.ieee.org/stamp/stamp.jsp?arnumber=05962509>>, Proceedings of IEEE International Conference on Communications (ICC), 2011, Jun. 5, 2011, pp. 1-5.

"Outdoor heterogeneous ISM/TVWS VSN testbed", Retrieved at <<http://www.crew-project.eu/vsn>>,Retrieved Date: Feb. 21, 2012, pp. 3.

Min, et al., "Detection of Small-Scale Primary Users in Cognitive Radio Networks", Retrieved at <<http://ieeexplore.ieee.org/stamp/stamp.jsp?tp=&arnumber=5701689>>, Proceedings of IEEE Journal on Selected Areas in Communications, vol. 29, Issue 2, Feb. 2011, pp. 13.

Kokkinene, Heikki, "Propagating Thoughts", Retrieved at <<http://www.fairspectrum.com/propagating-thoughts>>, May 20, 2012, pp. 7.

Fatemieh, et al., "Using Classification to Protect the Integrity of Spectrum Measurements in White Space Networks", Retrieved at <<http://www.cs.illinois.edu/~moinzad1/omid/pubs/FatemiehFCG11.pdf>>,In the Proceedings of the 18th Annual Network and Distributed System Security Symposium, Feb. 2011, pp. 17.

Gurney, et al., "Geo-location Database Techniques for Incumbent Protection in the TV White Space", Retrieved at <<http://

(56) References Cited

OTHER PUBLICATIONS ieeexplore.ieee.org/stamp/stamp.jsp?tp=&arnumber=4658242>>, Proceedings of 3rd IEEE Symposium on New Frontiers in Dynamic Spectrum Access Networks, Oct. 14, 2008, pp. 9.

PCT/US2013/045284, ISR and Written Opinion dated Sep. 18, 2013, European Patent Office.

Ghosh et al., "Coexistence Challenges for Heterogeneous Cognitive Wireless Networks in TV White Spaces," IEEE Wireless Communications, vol. 18, Issue 4, Aug. 25, 2011, pp. 22-31.

Simic et al., "Wi-Fi, but Not on Steroids: Performance Analysis of a Wi-Fi-Like Network Operating in TVWS under Realistic Conditions," Proceedings of the IEEE International Conference on Communications, 2012, pp. 1533-1538.

"TV White Spaces: A Global Momentum towards Commercialization", Retrieved at <<http://whitespace.i2r.a-star.edu.sg/TVWS_Workshop/Slides/8%209%2010_Inside%20the%20nerve%20Centre%20-%20COMPLETE%20 SESSION.pdf>>, Oct. 10, 2012, pp. 22.

Achtzehn, et al., "Deployment of a Cellular Network in the TVWS: A Case Study in a Challenging Environment", Retrieved at <<aachen.de/fileadmin/templates/images/PublicationPdfs/2011/CoRoNet2011-Cellular-in-TV-White-Spaces.pdf>>, In 3rd ACM workshop on Cognitive radio networks, Sep. 19, 2011, pp. 6.

Inter Digital, "Dynamic Spectrum Management," , White Paper, Oct. 12, 2012.

"International Search Report & Written Opinion" from PCT Application No. PCT/US2014/020949, Mailed Date: Jun. 6, 2014, Filed Date: Mar. 6, 2014, 11 pages.

Kertulla et al., "Dimensioning of Secondary Cellular in TVWS," Proceedings of the Seventh International Conference on Cognitive Radio Oriented Wireless Networks and Communications, Jun. 18-20, 2012, pp. 190-195.

Sato et al., "TV White Spaces as Part of the Future Spectrum Landscape for Wireless Communications," ETSI Workshop on Reconfigurable Radio Systems, Dec. 12, 2012.

Bogucka, et al., "Secondary spectrum trading in TV white spaces", Retrieved at <<http://ieeexplore.ieee.org/stamp/stamp.jsp?tp=&arnumber=6353691>>IEEE Communications Magazine, vol. 50, Issue. 11, Nov. 2012, pp. 9.

Feng, et al., "Database-Assisted Multi-AP Network on TV White Spaces: Architecture, Spectrum, Allocation and AP Discovery", Retrieved at <<http;??ieeexplore.ieee.org/stamp/stamp.jsp?tp=&arnumber=5936215>>, Symposium on New Frontiers in Dynamic Spectrum Access Networks, May 3, 2011, pp. 12.

"International Search Report & Written Opinion for PCT Application No. PCT/US2014/020951", Mailed Date: Jun. 10, 2014, Filed Date: Mar. 6, 2014, 12 Pages.

"Non-Final Office Action", From U.S. Appl. No. 13/773,660, filed Feb. 22, 2013, Mailed: Jun. 9, 2014.

"Response to the Jun. 9, 2014 Non-Final Office Action", From U.S. Appl. No. 13/773,660, Mailed: Oct. 30, 2014.

"Non-Final Office Action", From U.S. Appl. No. 13/828,622, filed Mar. 14, 2013, Mailed: Aug. 15, 2014.

"International Search Report & Written Opinion for PCT Patent Application No. PCT/US2013/058348", Mailed Date: Nov. 18, 2013, Filed Date: Sep. 6, 2013, 11 Pages.

Na, et al., "Policy-based Dynamic Channel Selection Architecture for Cognitive Radio Networks", In Proceedings of Second International Conference on Communications and Networking in China, Aug. 22, 2007, 5 Pages.

U.S. Appl. No. 13/525,370, Including any future O/As.

U.S. Appl. No. 13/609,271, Including any future O/As.

"International Search Report & Written Opinion" from PCT Patent Application No. PCT/US2014/016747, Mailed Date: Sep. 8, 2014, 9 Pages.

Marcus, et al., "Regulatory and Policy Issues—Unlicensed Cognitive Sharing of TV Spectrum: The Controversy at the Federal Communications Commission", In IEEE Communications Magazine, vol. 43 Issue 5, May 2005, pp. 24-25.

Austin, Mark, "Ofcom Consultation: Digital Dividend—Cognitive Access", In OFCOM, vol. 802 Issue No. 18, Feb. 16, 2009, 63 Pages.

"Response to International Search Report & Written Opinion" from PCT Patent Application No. PCT/US2014/020949, Filed Oct. 6, 2014, 15 pages.

"International Preliminary Report on Patentability," from PCT Patent Application No. PCT/US2014/020949, Mailed Date: Feb. 10, 2015, 7 pages.

"PCT Demand and Response to International Search Report & Written Opinion," Filed Oct. 6, 2014, 15 pages.

Saeed, et al., "TVBDs Coexistence by Leverage Sensing and Geo-location Database," Retrieved at <<http://ieeexplore.ieee.org/stamp/stamp.jsp?tp=&arnumber=6271147>>, International Conference on Computer and Communication Engineering, Jul. 3, 2012, 7 Pages.

"Requirement for Election/Restriction," Mailed Date: Jun. 10, 2014, From U.S. Appl. No. 13/609,271, filed Sep. 11, 2012, 6 pages.

"Response to the Requirement for Election/Restriction," Filed Date: Jun. 25, 2014, From U.S. Appl. No. 13/609,271, 7 pages.

"Non-Final Office Action," Mailed Date: Jul. 10, 2014, From U.S. Appl. No. 13/609,271, 11 pages.

"Response to the Jul. 10, 2014 Non-Final Office Action," Filed Date: Nov. 10, 2014, From U.S. Appl. No. 13/609,271, 14 pages.

"Response to Non-Final Office Action," Filed Date:Dec. 15, 2014, From U.S. Appl. No. 13/828,622, 12 pages.

"PCT Demand for International Preliminary Examination," Mailed Date: Dec. 22, 2014, From US PCT Application No. PCT/US2014/016747,14 pages.

"Final Office Action," Mailed Date: Nov. 25, 2014, From U.S. Appl. No. 13/609,271, 5 pages.

"Final Office Action," Mailed Date: Dec. 9, 2014, From U.S. Appl. No. 13/525,370, 15 pages.

"Response to Non-Final Office Action," Filed Date: Oct. 27, 2014, From U.S. Appl. No. 13/525,370, 12 pages.

"Non-Final Office Action," Mailed Date: Jun. 27, 2014, From U.S. Appl. No. 13/525,370, 13 pages.

U.S. Appl. No. 13/773,660, filed Feb. 22, 2013 by Hassan et al., 16 pages.

U.S. Appl. No. 13/828,820, filed Mar. 14, 2013 by Mitchell et al., 23 pages.

U.S. Appl. No. 13/828,622, filed Mar. 14, 2013 by Hassan, et al., 23 pages.

U.S. Appl. No. 13/525,370, filed Jun. 14, 2012 by Hassan et al., 12 pages.

U.S. Appl. No. 13/609,271, filed Sep. 11, 2012 by Hassan et al., 18 pages.

"Written Opinion of the International Preliminary Examining Authority," from PCT Patent Application No. PCT/US2014/016747, Mailed Date: Mar. 3, 2015, 8 pages.

"Written Opinion of the International Preliminary Examining Authority," from PCT Patent Application No. PCT/US2014/020951, Mailed Date: Feb. 16, 2015, 5 pages.

Seok, Yongho, (LG Electronics), "CC4 Comment-Resolution-Reduced Neighbor Report; 11-13-0024-02-00af-cc4-comment-resolution-reduced-neighbor report," IEEE SA Mentor; 11-13-0024-02-00AF-CC4-Comment-Resolution-Reduced-Neighbor-Report, IEEE-SA Mentor, Piscataway, NJ, USA, vol. 802.11af, No. 2, Jan. 14, 2013, pp. 1-5, XP068040396, [retrieved on Jan. 14, 2013].

"Non-Final Office Action," from U.S. Appl. No. 13/828,820, Mailed Mar. 3, 2015, 19 pages.

"Final Office Action," from U.S. Appl. No. 13/773,660, Mailed Jan. 27, 2015, 15 pages.

Final Office Action mailed Mar. 24, 2015 from U.S. Appl. No. 13/828,622, 18 pages.

First Office Action and Search Report mailed Jun. 23, 2015 from China Patent Application No. 201310241494.8, 13 pages.

Response filed Apr. 7, 2015 to Final Office Action mailed Dec. 9, 2014 from U.S. Appl. No. 13/525,370, 15 pages.

Notice of Allowance mailed May 4, 2015 from U.S. Appl. No. 13/525,370, 8 pages.

Applicant Initiated Interview Summary mailed Jun. 1, 2015 from U.S. Appl. No. 13/525,370, 2 pages.

(56) References Cited

OTHER PUBLICATIONS

Notice of Allowance mailed Jun. 1, 2015 from U.S. Appl. No. 13/525,370, 4 pages.
Response filed Feb. 23, 2015 to Final Office Action mailed Nov. 25, 2014 from U.S. Appl. No. 13/609,271, 9 pages.
Notice of Allowance mailed Mar. 24, 2015 from U.S. Appl. No. 13/609,271, 8 pages.
Hassan, et al., "White Space Utilization," U.S. Appl. No. 14/738,562, filed Jun. 12, 2015, 53 pages.
Preliminary Amendment filed Jun. 26, 2015 from U.S. Appl. No. 14/738,562, 8 pages.
Response filed Apr. 28, 2015 to Final Office Action mailed Jan. 27, 2015 from U.S. Appl. No. 13/773,660, 11 pages.
International Preliminary Report on Patentability mailed May 29, 2015 from PCT Patent Application No. PCT/US2014/016747, 11 pages.
Response filed Jun. 19, 2015 to Non-Final Office Action mailed Mar. 3, 2015 from U.S. Appl. No. 13/828,820, 10 pages.
Response filed Jun. 9, 2015 to Final Office Action mailed Mar. 24, 2015 from U.S. Appl. No. 13/828,622, 9 pages.
Demand under Article 34 filed Sep. 17, 2014, from PCT Patent Application No. PCT/US2014/020951,16 pages.
International Preliminary Report on Patentability mailed Jun. 4, 2015 from PCT Patent Application No. PCT/US2014/020951, 10 pages.
Non-Final Office Action mailed Aug. 13, 2015 from U.S. Appl. No. 13/828,622, 24 pages.
Response filed Sep. 24, 2015 to First Office Action mailed Jun. 23, 2015 from China Patent Application No. 201310241494.8, 9 pages.
Notice of Allowance mailed Sep. 18, 2015 from U.S. Appl. No. 13/525,370, 6 pages.
International Preliminary Report mailed Dec. 23, 2014 from PCT Patent Application No. PCT/US2013/045284, 9 pages.
Final Office Action mailed Aug. 24, 2015 from U.S. Appl. No. 13/828,820, 17 pages.
Notice of Allowance mailed Aug. 28, 2015 from U.S. Appl. No. 13/773,660, 9 pages.
Supplemental Notice of Allowability mailed Sep. 25, 2015 from U.S. Appl. No. 13/773,660, 2 pages.
International Search Report mailed Nov. 18, 2013 from PCT Patent Application No. PCT/US2013/058348, 12 pages.
Notice of Allowance mailed Dec. 30, 2015 from U.S. Appl. No. 13/525,370, 10 pages.
Notice of Allowance mailed Jan. 4, 2016 from U.S. Appl. No. 13/773,660, 20 pages.
Preliminary Amendment filed Dec. 22, 2015 from U.S. Appl. No. 14/951,426, 7 pages.
Intention to Grant mailed Feb. 15, 2016 from European Patent Application No. 14715154.2, 47 pages.
International Preliminary Report mailed Mar. 17, 2015 from PCT Patent Application No. PCT/US2013/058348, 8 pages.
Applicant-Initiated Interview Summary mailed Nov. 30, 2015 from U.S. Appl. No. 13/828,622, 3 pages.
Response filed Dec. 9, 2015 to the Final Office Action mailed Aug. 24, 2015 from U.S. Appl. No. 13/828,820, 11 pages.
Response filed Dec. 9, 2015 to the Non-Final Office Action mailed Aug. 13, 2015 from U.S. Appl. No. 13/828,622, 12 pages.
Voluntary Amendment filed Feb. 15, 2016 from China Patent Application No. 201480010128.4, 10 pages.
Non-Final Office Action mailed Feb. 5, 2016 from U.S. Appl. No. 14/951,426, 19 pages.
Second Office Action mailed Feb. 14, 2016 from China Patent Application No. 201310241494.8, 10 pages.
Final Office Action mailed Mar. 11, 2016 from U.S. Appl. No. 13/828,622, 43 pages.
Voluntary Amendment filed Mar. 16, 2016 from China Patent Application No. 201480015162.0, 7 pages.
Voluntary Amendment filed Mar. 16, 2016 from China Patent Application No. 201480015444.0, 6 pages.
Non-Final Office Action mailed May 5, 2016 from U.S. Appl. No. 13/828,820, 54 pages.
Response filed Apr. 29, 2016 to Non-Final Office Action mailed Feb. 5, 2016 from U.S. Appl. No. 14/951,426, 13 pages.
Response filed Apr. 25, 2016 to Second Office Action mailed Feb. 14, 2016 from China Patent Application No. 201310241494.8, 10 pages.
Response filed Aug. 10, 2016 to the Restriction Requirement mailed Jun. 24, 2016 from U.S. Appl. No. 14/738,562, 7 pages.
Restriction Requirement mailed Jun. 24, 2016 from U.S. Appl. No. 14/738,562, 6 pages.
Final Office Action mailed Jul. 26, 2016 from U.S. Appl. No. 14/951,426, 14 pages.
Non-Final Office Action mailed Aug. 17, 2016 from U.S. Appl. No. 14/738,562, 75 pages.
Response filed Aug. 31, 2016 to th Final Office Action mailed Jul. 26, 2016 from U.S. Appl. No. 14/951,426, 9 pages.
Response filed Sep. 2, 2016 to the Final Office Action mailed Mar. 11, 2016 from U.S. Appl. No. 13/828,622, 16 pages.
Response filed Sep. 27, 2016 to the Non-Final Office Action mailed May 5, 2016 from U.S. Appl. No. 13/828,820, 14 pages.
Terminal Disclaimer and Response filed Oct. 25, 2016 to the Non-Final Office Action mailed Aug. 17, 2016 from U.S. Appl. No. 14/738,562, 11 pages.
Response filed Oct. 24, 2016 to the Third Office Action mailed Aug. 29, 2016 from Chinese Patent Application No. 2013102414948, 10 pages.
Non-Final Office Action mailed Nov. 10, 2016 from U.S. Appl. No. 14/951,426, 26 pages.

* cited by examiner

WHITE SPACE UTILIZATION

PRIORITY

This Utility Application is a Continuation-In-Part of, and claims priority from, U.S. application Ser. No. 13/525,370 filed on Jun. 18, 2012, which is hereby incorporated by reference in its entirety.

BACKGROUND

Ever increasing numbers of wireless devices are being introduced and sold. As such, the radio frequency (RF) spectrum available for these wireless devices to communicate continues to get more and more crowded. More efficient use of the RF spectrum, and sharing under-utilized RF spectrum are very important to meet the growing number of wireless devices. One portion of the RF spectrum that is under-utilized is the portion reserved for television (TV) broadcasting. Governmental regulators divided the TV portion (and/or other portions) into a plurality of channels. However, for any given geographic region many of the channels are not utilized for TV or radio broadcasting.

Unused frequencies of the reserved TV portion of the RF spectrum can be referred to as TV white space. It is possible to utilize these TV white spaces for other uses, however, their use tends to be tightly regulated by governmental institutions (such as the Federal Communications Commission in the United States).

These governmental institutions are establishing databases that map channel or frequency utilization to geographic location. Stated another way, for a given location, the database can indicate a sub-set of frequencies that are utilized for TV broadcasting and other licensed use (such as wireless microphones in some countries) and/or a different sub-set of frequencies that are TV white spaces. Potentially, the governmental institutions may allow individual TV white space frequencies to be temporarily used for other purposes. However, any access point device (sometimes referred to as a "master") that wants to temporarily use one or more of these TV white space frequencies has to have the capability to know its own geographic location to within an accuracy acceptable by the regulators and also has to have access to the database via the Internet so that the device's location can be utilized in conjunction with the locations in the database. The device may be able to obtain authorization to utilize individual TV white space frequencies according to specific conditions or constraints. For instance, the constraints may relate to the location of the device, a duration of the authorization, and/or an allowed transmission power. Other available radio frequencies may be handled in a similar manner.

SUMMARY

The described implementations relate to radio white space utilization. As used herein, the term "radio white space" can include TV white space and/or any other radio white space. One example can interact with a wireless device that is configured to obtain authorization to use a set of radio white space frequencies in accordance with one or more constraints. The example can obtain an individual radio white space frequency and associated individual constraints. This example can also utilize the individual radio white space frequency for network access independent from the wireless device that is configured to obtain the authorization.

Another example can include memory and a processor configured to execute instructions stored on the memory. This example can also include a communication component configured to interact with a wireless access point to request that the wireless access point obtain authorization to use one or more radio white space frequencies based upon constraints. The communication component can be further configured to utilize an individual radio white space frequency in accordance with the constraints for network connectivity independent of the wireless access point. The communication component can be further configured to monitor the constraints and to obtain another authorization prior to violating any of the constraints.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing radio white space frequencies, and more specifically to utilization of radio white space frequencies by devices that may not otherwise have the capabilities to utilize radio white space frequencies. Such a device may have wireless capabilities, such as Wi-Fi direct capabilities. However, the device may lack the capability to determine its geographic location and/or may lack the ability to interact with regulatory databases that control radio white space frequency usage. Toward this end, the device can leverage another device that does have such capabilities in order to obtain authorization to utilize radio white space frequencies. As mentioned above, radio white space frequencies can include TV white space frequencies and/or other radio white space frequencies. As used herein a "TV white space frequency" means a frequency or frequency range that was reserved for TV broadcasting, but which is not actually used for TV broadcasting in a particular geographic region. Similarly, "radio white space frequency" means a frequency or frequency range that was reserved for TV broadcasting, for other radio broadcasting, or two way radio communications, but which is not actually used in such manner in a particular geographic region.

First System Example

Figure 1:
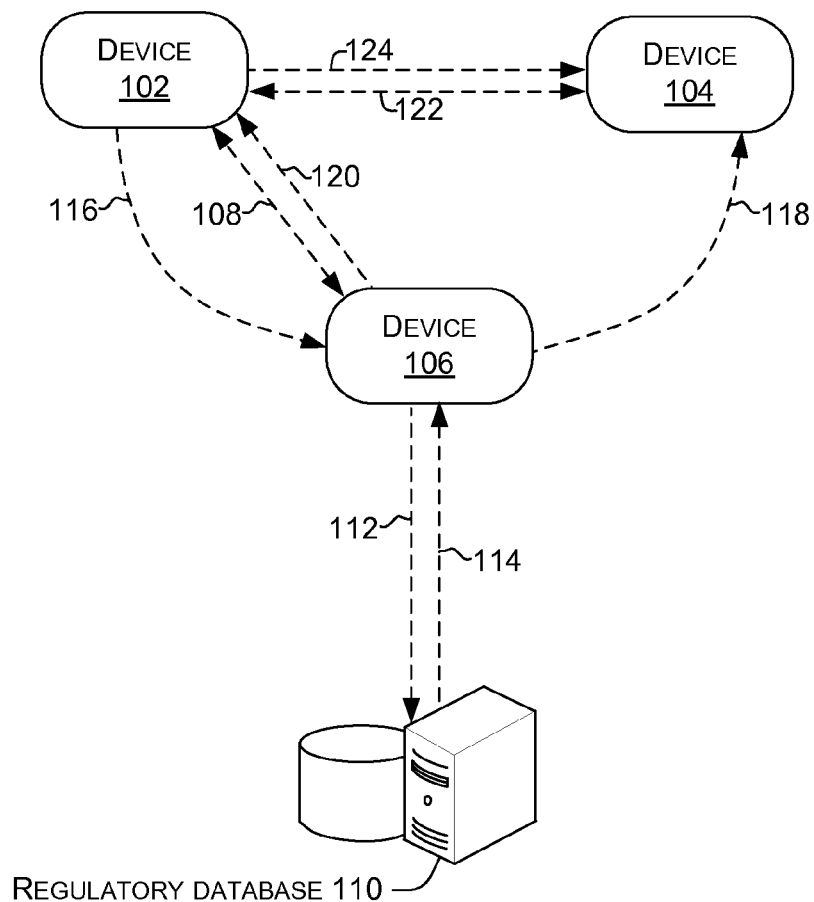
FIGS. 1-8 show examples of systems configured to utilize radio white space frequencies in accordance with some implementations of the present concepts.

For purposes of explanation consider introductory FIG. 1, which shows a system 100 where utilization of radio white space frequencies can be accomplished by devices that may not otherwise have the capabilities to utilize radio white space frequencies. This example is explained relative to TV white space frequencies but can alternatively or additionally be applied to other radio white space frequencies.

In this case, system 100 includes devices 102, 104, and 106. Assume for purposes of explanation that device 102 wants to convey data to device 104. Also, while multiple frequencies may be available to convey data from device 102 to device 104, these frequencies may be crowded (e.g., in use by other devices) and/or offer lower data transfer rates than TV frequencies. Toward this end, device 102 may want to utilize one or more TV white space frequencies for communication purposes, such as to convey the data and/or to maintain network connectivity.

Assume further that devices 102 and 104 have wireless capabilities. For instance, both devices 102 and 104 can be Wi-Fi direct compliant, Bluetooth compliant, and/or have other wireless capabilities. However, devices 102 and 104 may not have the capability to access the Internet and/or may not have the capability to determine their respective geographic locations. In contrast, device 106 can have wireless capabilities and can have the capability to access the Internet and the ability to determine its (device 106's) geographic location. In this example, device 106 can function as a wireless access point.

Device 102 can participate in a session 108 with device 106 to accomplish the goal of utilizing TV white space frequencies to convey data to device 104. In this session 108, device 106 can assume the role of the wireless access point and device 102 can assume a client role relative to the session. During the session 108, device 102 can interact with device 106 to cause device 106 to obtain authorization to use a set of TV white space frequencies in accordance with one or more constraints.

To obtain the authorization, device 106 can determine its geographic location. Device 106 can access a regulatory web-site or database 110. Device 106 can supply its geographic location to the regulatory database 110 and request to use one or more TV white space frequencies as indicated at 112. The regulatory database 110 can authorize use of a set of one or more available TV white space frequencies at the geographic location and a set of other constraints on the use as indicated at 114. For example, the constraints may include a duration of the authorization and/or a specific transmission energy or power level which any transmissions over the frequency are not to exceed.

Now recall that one objective of this process is for device 102 to convey data to device 104 over an authorized TV white space frequency. At this point, device 102 could accomplish this objective by sending the data to device 106 as indicated at 116. Device 106 could then send the data to device 104 as indicated at 118. However, the effective data transmission rate is basically halved in that half of the data transmission rate is utilized for the communication between device 102 and device 106 and the other half between device 106 and device 104. Another option for accomplishing the objective can involve device 102 leaving session 108 with device 106 (and/or otherwise bypassing device 106) and utilizing the authorization for communicating data with other devices; in this case, device 104.

Device 102 can obtain the authorization information from device 106 as indicated at 120. Device 102 can determine its location relative to device 106 so that device 102 can operate in compliance with the constraints. Examples of techniques for determining relative location are described below relative to FIG. 3.

Device 102 can convey the availability of individual frequencies of the set of one or more available TV white space frequencies and device 102's intention to utilize individual TV white space frequencies. In one case, device 102 can function as a group owner to establish Wi-Fi communication with device 104 as indicated at 122. During the Wi-Fi establishment, device 102 can convey an individual TV white space frequency(ies) from the set of one or more authorized TV white space frequencies over which device 102 can transmit to device 104. In another case, device 102 can utilize Bluetooth or LTE technologies to convey the availability of individual frequencies of the set of one or more available TV white space frequencies and device 102's intention to utilize individual TV white space frequencies. Device 102 can then communicate with device 104 over the individual TV white space frequency in compliance with the constraints as indicated at 124. Such a configuration can provide double the effective data transmission rate than the previous configuration where the communication is achieved via device 106.

To summarize, device 102 can act in a client role with device 106 and essentially use device 106 as a proxy to obtain TV white space authorization information that device 102 otherwise could not obtain. Device 102 can assume a host or group owner function with device 104 to indicate to device 104 what frequencies (authorized TV white space frequencies) to utilize for data communication with device 102. Thus, device 102 can indirectly obtain authorization to use one or more available TV white space frequencies (in accordance with the constraints) free from interference and with the relatively high data transfer rates offered by TV frequencies and bypass the data rate limitations involved with utilizing an intermediary device.

Second System Example

Figure 2:
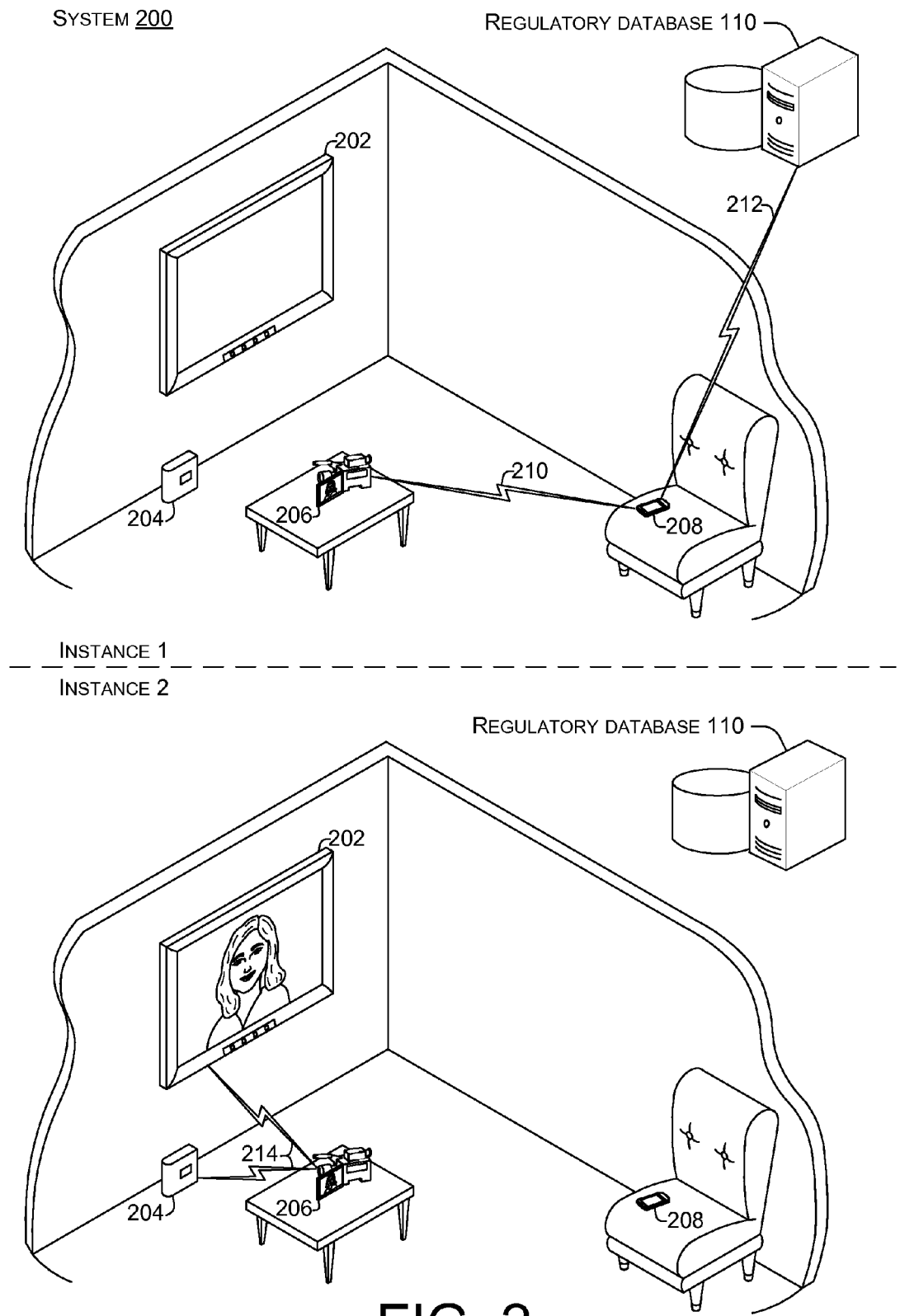

FIG. 2 shows an example environment or system 200 in which utilization of TV white space frequencies can be accomplished. For purposes of explanation, system 200 is described relative to an instance 1 and a subsequent instance 2. In this case, system 200 includes a display device 202, a hard drive back-up device 204, a video camera device 206, and a smart phone device 208. These devices can represent manifestations of the generic devices introduced above relative to FIG. 1. In this case, assume that video camera device 206 wants to communicate video data to display device 202 and hard drive back-up device 204. For instance, a user may have instructed the video camera device to communicate the video data to the display device 202 and the hard drive back-up device 204 by interacting with user interface controls on the video camera device.

In instance 1, video camera device 206 can communicate with smart phone device 208 as indicated at 210. For instance, smart phone device 208 can function as a wireless access point and the video camera device 206 can function in a client role. The video camera device 206 can cause the smart phone device 208 to access regulatory database 110 to obtain authorization to utilize TV white space frequencies subject to constraints as indicated at 212. The video camera device 206 can receive the authorization and constraints from the smart phone device 208. The video camera device 206 and/or the smart phone device 208 can select one or more frequencies of the authorized TV white space frequencies to utilize.

In instance 2, the video camera device 206 can function as a group owner to establish Wi-Fi communication with display device 202 and hard drive back-up device 204 as indicated at 214. The video camera device 206 can convey the selected frequencies to the display device 202 and hard drive back-up device 204. The video camera device 206 can transmit the video data to the display device 202 and hard drive back-up device 204. For instance, the video data can be stored by the hard drive back-up device 204 and displayed by the display device 202. This configuration can have twice the effective bandwidth compared to a configuration where the smart phone device 208 functions as a wireless access point that receives the video data from the video camera device 206 and conveys the video data to the display device 202 and hard drive back-up device 204.

Figure 3:
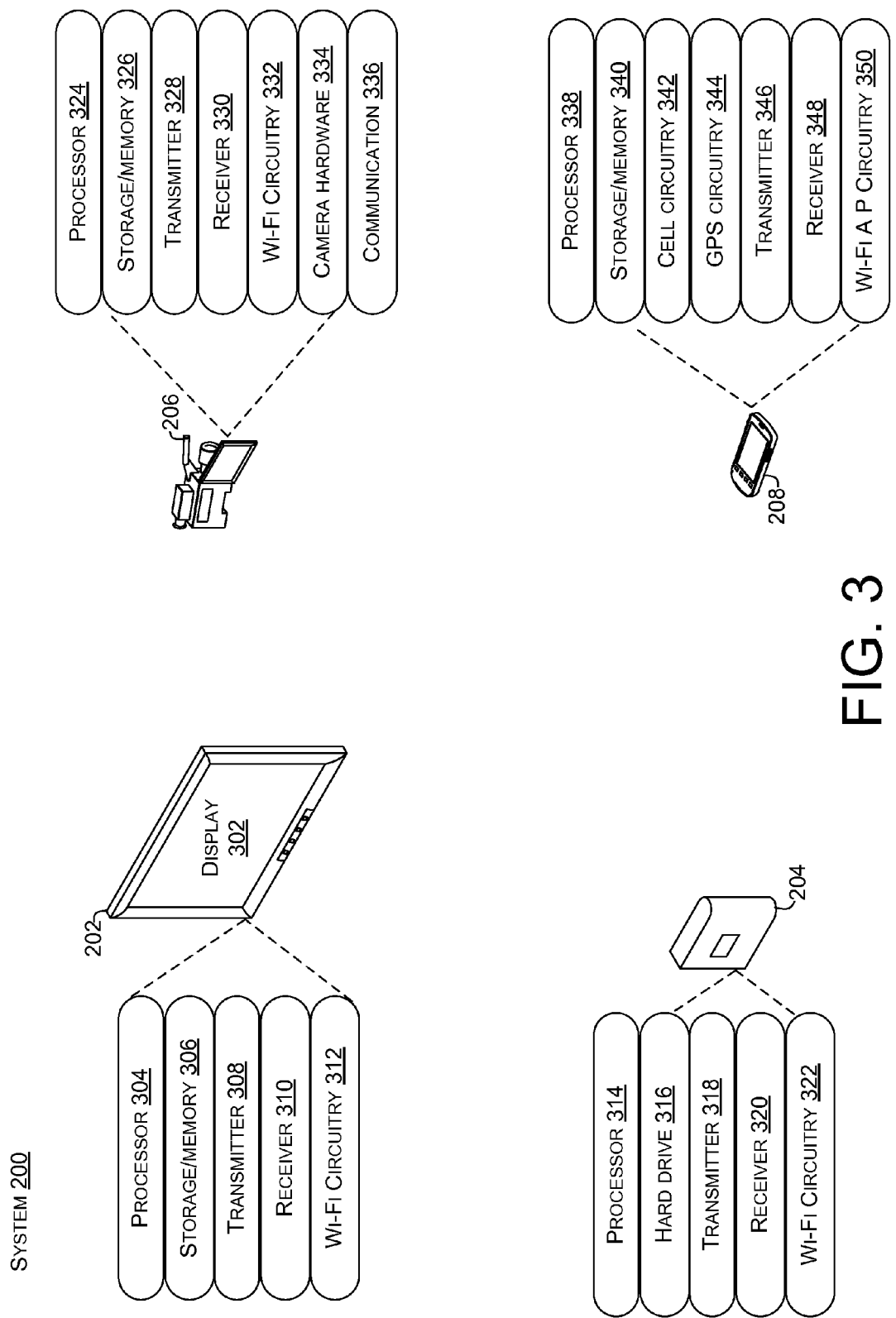

FIG. 3 shows display device 202, hard drive back-up device 204, video camera device 206, and smart phone device 208 of system 200 and introduces some of the elements or components of these devices in accordance with one implementation.

In this case, display device 202 includes a display 302, a processor 304, storage/memory 306, a transmitter 308, a receiver 310, and Wi-Fi circuitry 312. The hard drive back-up device 204 includes a processor 314, solid state or disc hard drive 316, a transmitter 318, a receiver 320, and Wi-Fi circuitry 322.

Video camera device 206 includes a processor 324, storage/memory 326, a transmitter 328, a receiver 330, Wi-Fi direct circuitry 332, camera hardware 334, and a communication component 336. Smart phone device 208 includes processor 338, storage/memory 340, cellular circuitry 342, GPS circuitry 344, a transmitter 346, a receiver 348, and Wi-Fi access point circuitry 350. Of course, individual devices can include alternative or additional components that are not described here for sake of brevity.

In relation to the display device 202 the transmitter 308 and the receiver 310 can function to transmit and receive data at various frequencies. The transmitter and the receiver can function collectively with the Wi-Fi circuitry 312 to transmit and receive data in the 2.4 Giga Hertz and 5.0 Giga Hertz bands utilized for Wi-Fi in the U.S. (other countries may utilize other frequencies). Transmitter 318 and receiver 320 can function in a similar manner relative to hard drive back-up device 204 and transmitter 328 and receiver 330 can perform a similar role for video camera device 206. Further, transmitter 346 and receiver 348 can perform a similar function for smart phone device 208 in a cooperative manner with cellular circuitry 342, GPS circuitry 344, transmitter 346, and Wi-Fi access point circuitry 350. The various transmitters and receivers can be configured to operate at specific frequencies, such as 2.4 Giga Hertz frequency, 5.0 Giga Hertz frequency, 60 Giga Hertz frequency, radio frequencies, and/or TV channel frequencies (50 Mega Hertz to 810 Mega Hertz), among others. Alternatively, the transmitters and receivers can be configured to tune to any frequencies in the RF spectrum. While discrete components or elements are illustrated, some implementations may combine elements. For instance, Wi-Fi circuitry, such as Wi-Fi circuitry 312 may include dedicated transmitters and receivers rather than interfacing with distinct transmitters and receivers.

As introduced above, an individual device, such as the video camera device 206, can interface with another device to obtain authorization to utilize available radio white space frequencies, such as TV white space frequencies with a different device. In this example, the video camera device's communication component 336 can cause communications to be established with smart phone device 208 via transmitter 328 and receiver 330 and/or Wi-Fi circuitry 332. For instance, the communication component can be configured to interact with Wi-Fi access point circuitry 350 when the smart phone device functions as a wireless access point. In such a case, the video camera device's transmitter 328 and receiver 330 can operate in cooperation with Wi-Fi access point circuitry 350 and/or transmitter 346 and receiver 348 of smart phone device 208. In another case, the communication component can utilize another wireless technology, such as Bluetooth™ to interact with smart phone device 208. Once communication is established, the communication component 336 can request that the smart phone device 208 query the regulatory database (FIGS. 1 and 2).

The smart phone device 208 can utilize its GPS circuitry 344 (or another technique such as cell tower triangulation) to determine its location. The smart phone device can access the regulatory database to obtain authorization to use one or more radio white space frequencies based on the location of the smart phone device (e.g., the regulatory database maps available versus unavailable frequencies per location). For instance, the smart phone device can access the Internet via cellular circuitry 342. The smart phone device can then access a uniform resource identifier (URI) of the regulatory database to obtain the authorization based upon the location of the smart phone device and/or other constraints.

The video camera device's communication component 336 can obtain the authorization and accompanying information, such as the location and constraints, from the smart phone device 208. In some cases, the authorization obtained by the video camera device may be exactly the authorization that was obtained by the smart phone device 208. In other cases, the smart phone device may retain some of the authorized radio white space frequencies for its own use and pass others to the video camera device. For instance, the authorization might include two radio white space frequencies. The smart phone device might utilize one of the radio white space frequencies for its own use and pass the other to the video camera device.

In some instances, the communication component 336 can take steps to ensure that any usage of the authorization by the video camera device 206 complies with the constraints. For instance, the constraints may include a distance constraint on the authorization. In some cases, the distance constraint can be conveyed as a power constraint that limits the power or energy of any broadcast to a specific radius from the smart phone's location. For example, the constraint may be a power constraint such that any broadcast from the smart phone device's location over an available radio white space frequency is limited to a radius of 1,000 meters, for instance. The communication component 336 can take steps to ensure that any use by the video camera device conforms to the distance constraint. Stated another way, the communication component 336 can consider (or account for) the relative distance between the smart phone device 208 and the video camera device 206.

In one case, the communication component 336 can determine its location relative to the smart phone device 208 based upon the success or failure of its communications with the smart phone device at a given frequency and power. For instance, at 2.4 Giga Hertz, a 100 milli Watt transmission can generally be received by commercial Wi-Fi or Bluetooth compliant devices up to a range of about 100 meters. Thus, the communication component 336 can determine the video camera device's relative location to be within 100 meters of the smart phone device in an instance where the two devices are successfully communicating at this power and frequency.

Further, knowing its relative location can allow the communication component 336 to ensure that any use of the available radio white space frequencies by the video camera device complies with the authorization constraints. For example, the communication component can determine a transmission power that does not exceed 500 meters for the available radio white space frequency. Thus, if the video camera device is within 100 meters of the smart phone device and broadcasts a signal over the available radio white space frequency at a power level that is only detectable for 500 meters, then the maximum transmission distance from the authorized location (e.g., the location of the smart phone device) is less than or equal to 600 meters, which falls within the 1000 meter constraint associated with the authorization.

As mentioned above, the authorization constraints may also include a time duration. In such a case, the communication component 336 can obtain a time stamp of the authorization from the smart phone device. The communication device can then track the time from the time stamp to ensure that the duration is not exceeded. Thus, the communication component can ensure that any communications conducted by the video camera device satisfy the authorization constraints (e.g., stop before the expiration of the authorization). Further, in some implementations, the communication device can certify to the smart phone device that the authorization constraints will be followed in accordance with any use of the authorization by the video camera device.

Once the video camera device 206 obtains the authorization for available radio white space frequencies, the communication component 336 can utilize the available radio white space frequencies for any purpose as long as it abides by the authorization constraints. For instance, the video camera device can utilize the available white space frequencies as a communication avenue to transfer data and/or to maintain network connectivity, among other uses.

The communication component 336 can use various techniques to convey the available radio white space frequencies to other devices. For example, the communication component can communicate with other devices about the available radio white space frequencies using 802.11 technologies, Bluetooth technologies, or long term evolution (LTE) technologies, among others. In one such example, the communication component 336 can communicate the presence of available radio white space frequencies using management frames or actions frames of the 802.11 technologies.

In a specific example utilizing the 802.11 technologies, the communication component 336 can cause the video camera device 206 to operate as a Wi-Fi direct group owner to establish Wi-Fi communication with a different device or devices. The communication component 336 can select one or more of the available radio white space frequencies associated with the authorization. By functioning as a Wi-Fi direct group owner, the communication component can identify the selected available radio white space frequencies and instruct the different device(s) to expect communications over the selected available radio white space frequencies. The communication component can then cause the data from the storage/memory 326 to be communicated over the selected available radio white space frequencies. Thus, the video camera device is able to obtain the authorization to use available radio white space frequencies without knowing its own geographic location and/or without being able to access a regulatory database that regulates the use.

In some implementations, the communication component 336 may be configured to attempt to maintain available radio white space frequencies for use by the video camera device. For instance, the communication component may monitor the constraints associated with authorization to utilize available radio white space frequencies. For instance, in the above example, the authorization includes a constraint on the duration of use (e.g., time constraint).

The communication component 336 can track the constraint of the authorization and proactively take actions to maintain the availability of radio white space frequencies for use by the video camera device. In this case, assume for purposes of explanation that the duration of the time constraint is 24 hours. At some point through the 24 hours the communication component can take actions to ensure that radio white space frequencies continue to be available for the video camera device at the expiration of the 24 hour duration constraint. For instance, at 12 hours through the 24 hour time constraint, the communication component can attempt to obtain a new authorization to use radio white space frequencies. For example, the communication component may check to see whether the smart phone device 208 and/or a different device is available to obtain a new authorization on behalf of the video camera device. If so, the communication component may cause the available device to obtain the new authorization.

If no device is available, the communication component may repeat the checking as the duration continues toward expiration. The checking may be performed at predefined intervals or the checking may become more frequent as the expiration approaches. Once a suitable device is identified, the communication component can cause the new authorization to be achieved in a similar manner to the technique described above relative to FIGS. 1-2. Of course, the new authorization may relate to different radio white space frequencies than the earlier obtained authorization. The communication component can utilize this proactive technique to maintain radio white space frequencies for use by the video camera device to maintain network connectivity and/or for data communication, among other uses.

From one perspective, the video camera device 206 can communicate with the smart phone device 208 and essentially instruct the smart phone device to act as a proxy on behalf of the video camera device to obtain the authorization. The video camera device can then ensure that it (the video camera device) can utilize the available radio white space frequencies consistent with the authorization. The video camera device can finish the process without the smart phone device and can cease communications with the smart phone device. The video camera device can then select one or more of the available radio white space frequencies and identify the selected frequency(ies) to other devices with which communication can occur. In the above example, the video camera device identifies the selected frequency to the other devices (display device 202 and hard drive back-up device 204) by functioning as a Wi-Fi direct group owner. The video camera device can then communicate over the selected individual radio white space frequency in accordance with the authorization.

Display device 202, hard drive back-up device 204, video camera device 206, and smart phone device 208 can be thought of as computers or computing devices as defined to be any type of device that has some amount of processing capability and/or storage capability. Processing capability can be provided by one or more processors that can execute data in the form of computer-readable instructions to provide a functionality. Data, such as computer-readable instructions, can be stored on storage/memory. The storage/memory can be internal and/or external to the computer. The storage/memory can include any one or more of volatile or non-volatile memory, hard drives, flash storage devices, and/or optical storage devices (e.g., CDs, DVDs etc.), among others. As used herein, the term "computer-readable media" can include transitory and non-transitory instructions. In contrast, the term "computer-readable storage media" excludes transitory instances and signals. Computer-readable storage media can include "computer-readable storage devices". Examples of computer-readable storage devices include volatile storage media, such as RAM, and non-volatile storage media, such as hard drives, optical discs, and flash memory, among others.

In the illustrated implementation, display device 202, hard drive back-up device 204, video camera device 206, and smart phone device 208 are configured with general purpose processors and storage/memory. In some configurations, such devices can include a system on a chip (SOC) type design. In such a case, functionalities can be integrated on a single SOC or multiple coupled SOCs. In one such example, the video camera device can include shared resources and dedicated resources. An interface(s) can facilitate communication between the shared resources and the dedicated resources. As the name implies, dedicated resources can be thought of as including individual portions that are dedicated to achieving specific functionalities. For instance, in this example, the dedicated resources can include any of transmitter 328, receiver 330, Wi-Fi circuitry 332, and/or communication component 336.

Shared resources can be storage, processing units, etc. that can be used by multiple functionalities. In this example, the shared resources can include the processor and/or storage/memory. In one case, communication component 336 can be implemented as dedicated resources. In other configurations, this component can be implemented on the shared resources and/or the processor can be implemented on the dedicated resources.

In some configurations, the communication component 336 can be installed during manufacture of the video camera device or by an intermediary that prepares the video camera device 206 for sale to the end user. In other instances, the end user may install the communication component 336, such as in the form of a downloadable application or from a USB thumb drive, among others.

Third System Example

FIGS. 4-7 collectively show a system 400 where utilization of radio white space frequencies can be accomplished by devices that may not otherwise have the capabilities to obtain authorization to utilize radio white space frequencies. System 400 relates to a device 402 that is similar to device 102 introduced above relative to FIG. 1 in that device 402 may not have the capability to access the Internet and/or may not have the capability to determine its geographic location. Device 402 does have some wireless capabilities, such as Wi-Fi, Bluetooth and/or LTE, among others.

Figure 4:
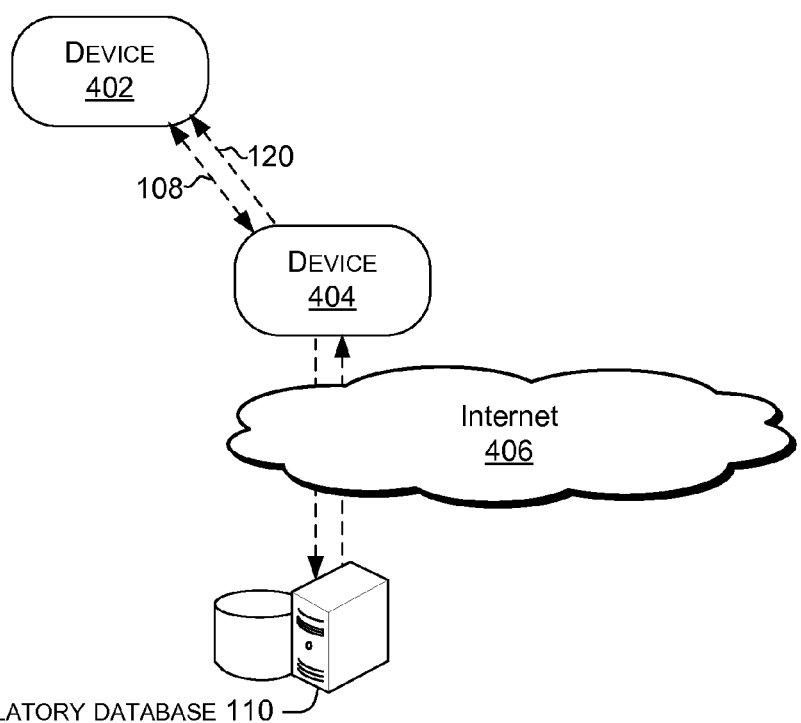

As evidenced in FIG. 4, device 402 can communicate with a device 404. This device 404 does have the capability to access the Internet and the ability to determine its (device 404's) geographic location. Device 402 can cause device 404 to query regulatory database 110 to obtain an authorization to utilize one or more radio white space frequencies in accordance with one or more constraints. As noted above, the constraints can include the location of device 404. Device 402 can receive the radio white space frequency authorization and constraints from device 404. Device 402 can then utilize the authorized radio white space frequency(ies) in accordance with the constraints independent of device 404. For instance, device 404 could be a smart phone device. The owner could subsequently take the smart phone device and leave the area of device 402.

Figure 5:
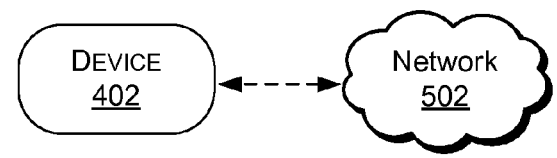
Figure 5:
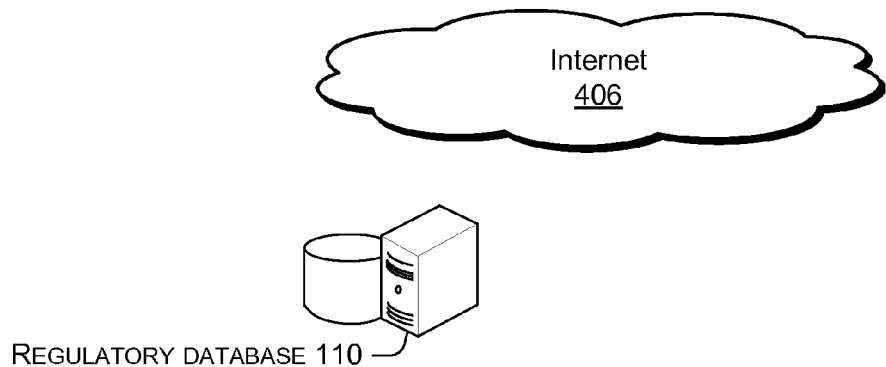

In FIG. 5, device 402 can utilize the authorized radio white space frequency(ies) to establish and/or maintain network connectivity (represented by network 502).

Figure 6:
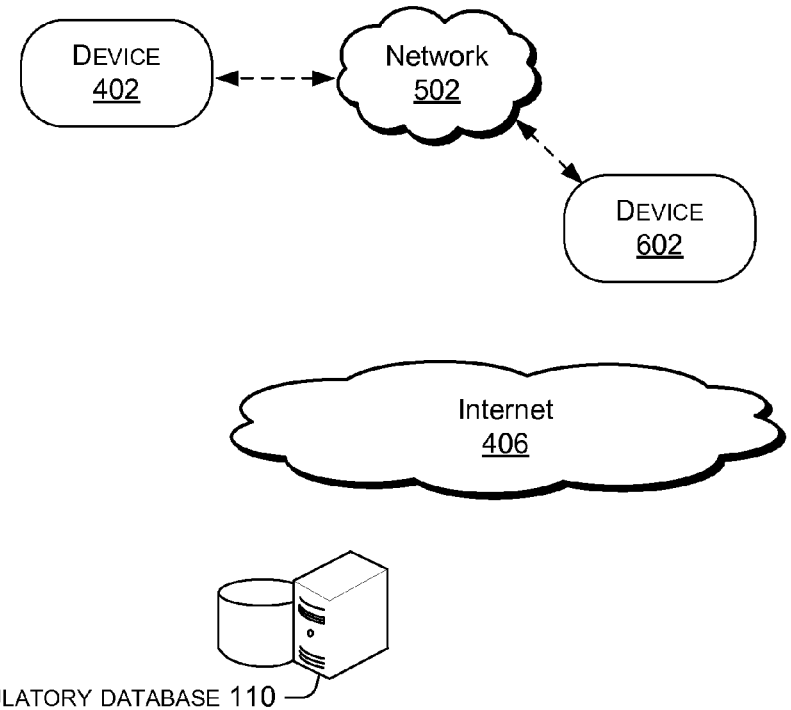

FIG. 6 shows an example, where the network connectivity allows device 402 to communicate with a device 602 via the authorized radio white space frequency(ies).

As mentioned above, in some implementations device 402 can track or monitor the constraints associated with the authorization. For instance, one constraint discussed above relates to duration of the authorization. As time elapses, device 402 may begin to attempt to obtain another authorization to maintain continuous access to individual available radio white space frequencies. In one case, the device can attempt to obtain another authorization at predefined percentages of the time duration. For example, the device may attempt to obtain another authorization when the duration is 50% over and if unsuccessful, repeat the attempt at 75%, and then every five percent thereafter until successful. Of course this is but one example configuration.

In another example, device 402 may continue to track its relative location. For instance, the device could track that it is being moved (or has been moved) during the authorized use. Depending on the distance that the device has been moved it may no longer be able to confirm that it is complying with the location constraint associated with the authorization. In either of these scenarios the device can attempt to obtain a new authorization. For example, the device may attempt to establish communication with device 404 or a similar device that has internet access and the ability to determine its (device 404's or the similar device's respectively) location.

Figure 7:
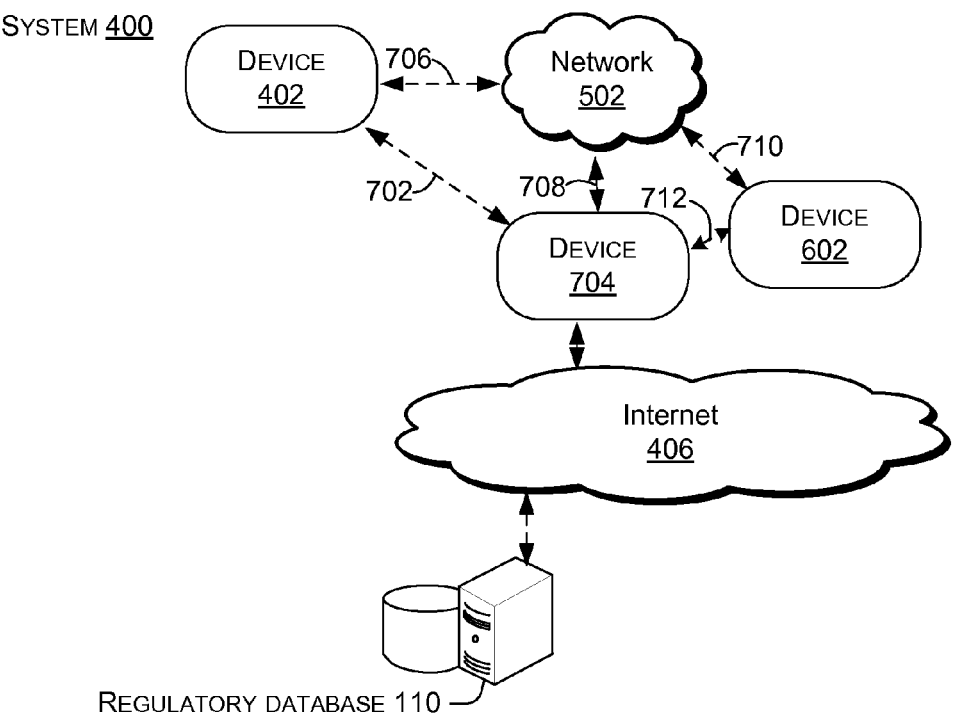

FIG. 7 shows multiple scenarios which allow device 402 to attempt to obtain another authorization to utilize available radio white space frequencies. In one case, indicated at 702, device 402 may communicate directly with device 704 that can function as a wireless access point similar to device 106 (FIG. 1). In another case, device 402 may communicate with device 704 through network 502 directly as indicated by arrows 706 and 708 or indirectly through device 602 as indicated by arrows 706, 710, and 712.

FIG. 7 illustrates still another potential scenario. In this scenario, assume that device 704 can access the Internet 406. Further assume that neither device 402 nor device 704 can determine its own location, but that device 602 can determine its own location. In such a scenario, device 402 can obtain location information from device 602 and cause device 704 to utilize that location information when querying regulatory database 110 to obtain the authorization to utilize available radio white space frequencies. Device 402 can then calculate its own location relative to device 602 to ensure that device 402 utilizes the authorization in compliance with the location constraint.

To summarize, in this scenario device 402 can leverage two other different devices to obtain the authorization: one device providing the location information; and another device providing the Internet access.

Fourth System Example

Figure 8:
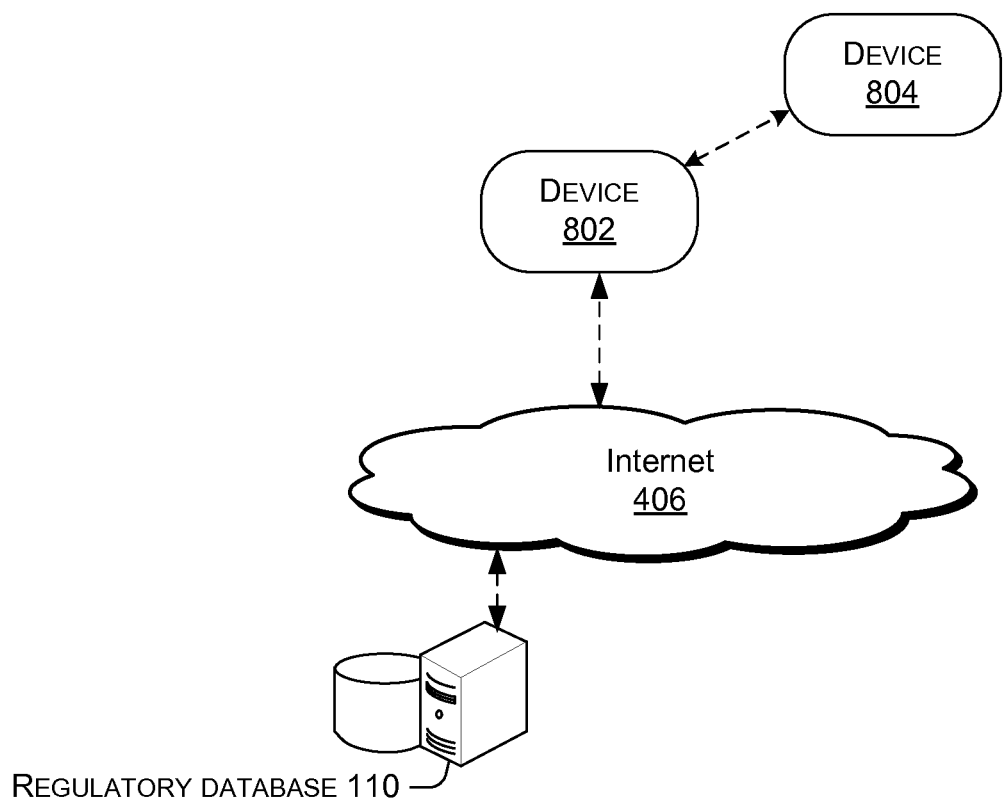

FIG. 8 shows another system 800 where utilization of radio white space frequencies can be accomplished by devices that may not otherwise have the capabilities to obtain authorization to utilize radio white space frequencies. System 800 relates to a device 802 that wants to obtain authorization to utilize radio white space frequencies in compliance with associated constraints. In this case, assume that device 802 can access the Internet 406. Such access could be wireless or wired access. However, assume that device 802 does not have the capability to determine its geographic location. For instance, in one manifestation, device 802 could be a desktop computer that has wired access to the Internet 406, such as through a T-1 line. The desktop computer may also have a wireless card, but no GPS components or other mechanisms for determining geographic location. In such a case, device 802 could establish communications with another device 804 that has the ability to determine its own geographic location.

Device 802 could then determine its location relative to device 804. For instance, examples are described above for utilizing the ability to communicate over known protocols such as Bluetooth, 802.11(b) 802.11(g) and/or 802.11(n) as indicating that the two devices are within a given distance. For example, a Bluetooth Class 2 device utilizing the maximum allowable 2.5 milliwatts of power at 4 dBm has a range of about 10 meters. Thus, the ability of device 802 to successfully send and receive data with device 804 in accordance with this Class 2 standard indicates that the devices are within 10 meters of one another.

Device 802 can utilize the geographic location information from device 804 with the margin of error associated with their separation (in the above Bluetooth example the margin of error is a radius of 10 meters) when querying regulatory database 110 to obtain authorization to utilize radio white space frequencies in compliance with associated constraints. Device 802 could then utilize the authorized radio white space frequencies to communicate with wireless devices at a greater data transmission rate than might otherwise be available and/or for other uses.

First Method Example

Figure 9:
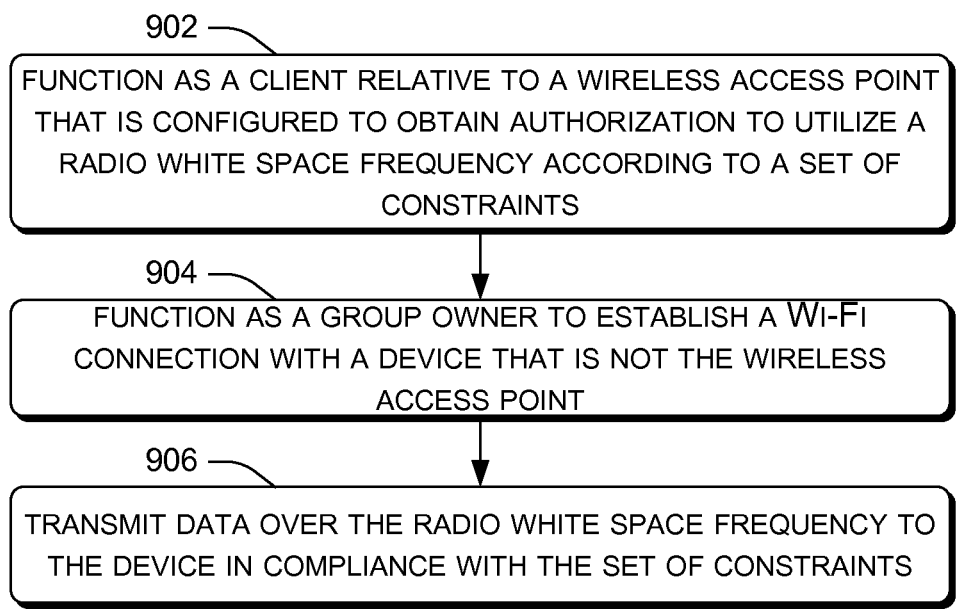
FIGS. 9-13 are flowcharts of examples of radio white space frequency utilization techniques in accordance with some implementations of the present concepts.

FIG. 9 shows a method 900 for utilization of radio white space frequencies.

The method can entail functioning as a client relative to a wireless access point that is configured to obtain authorization to utilize a radio white space frequency according to a set of constraints at 902.

The method can also entail functioning as a group owner to establish a Wi-Fi connection with a device that is not the wireless access point at 904.

The method can include transmitting data over the radio white space frequency to the device in compliance with the set of constraints at 906.

In summary, the method can allow a device to utilize another device as a proxy to obtain an authorization to utilize radio white space frequencies subject to constraints. The device can then discard the proxy and utilize some of the authorized radio white space frequencies for other purposes while complying with the constraints. The method can be useful in instances where the device could not otherwise obtain the authorization on its own. The method can also provide a higher effective data transfer rate to the device than a configuration where the proxy used the authorization and the device communicated data through the proxy to other devices.

Second Method Example

Figure 10:
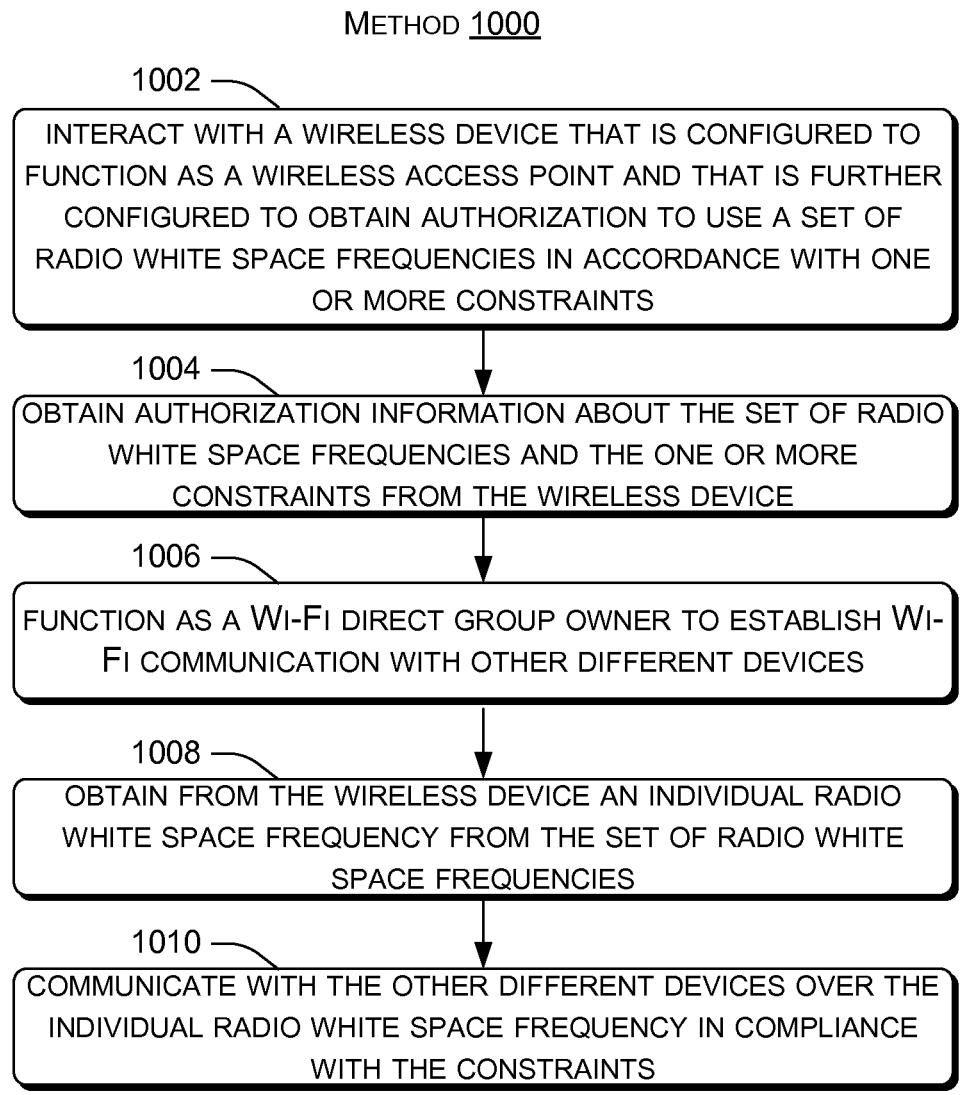

FIG. 10 shows a method 1000 for utilization of radio white space frequencies.

The method can include interacting with a wireless device that is configured to function as a wireless access point and that is further configured to obtain authorization to use a set of radio white space frequencies in accordance with one or more constraints at 1002.

The method can entail obtaining authorization information about the set of radio white space frequencies and the one or more constraints from the wireless device at 1004.

The method can include functioning as a Wi-Fi direct group owner to establish Wi-Fi communication with other different devices at 1006.

The method can include obtaining from the wireless device an individual radio white space frequency from the set of radio white space frequencies at 1008.

The method can also include communicating with the other different devices over the individual radio white space frequency in compliance with the constraints at 1010.

Third Method Example

Figure 11:
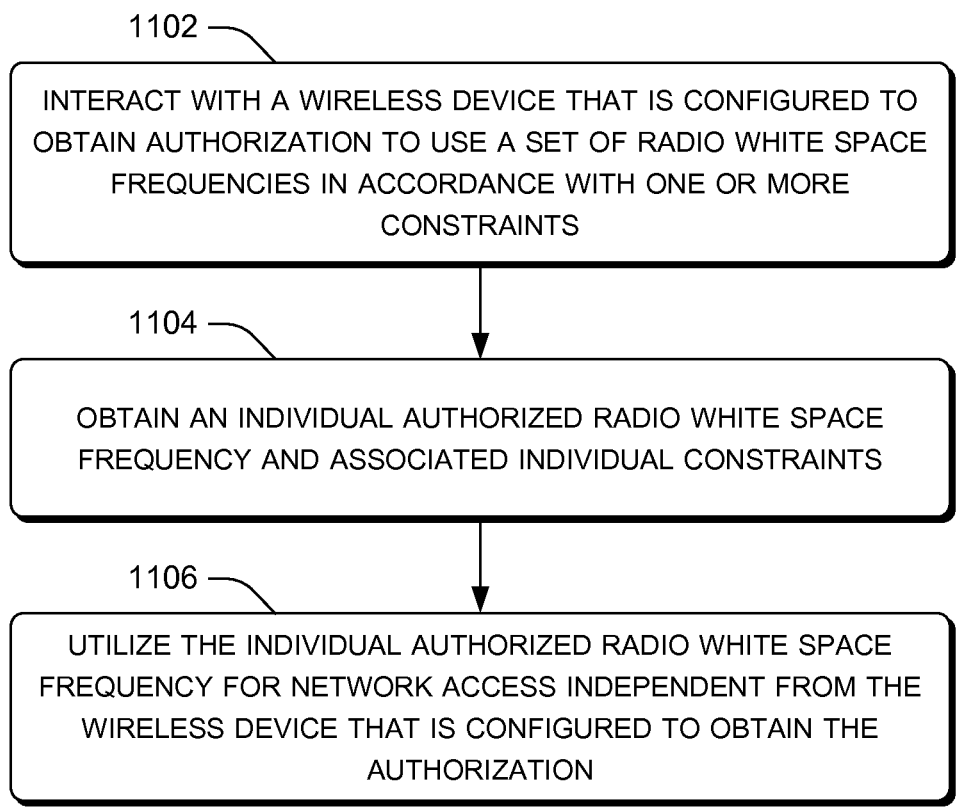

FIG. 11 shows a method 1100 for utilization of radio white space frequencies.

The method can include interacting with a wireless device that is configured to obtain authorization to use a set of radio white space frequencies in accordance with one or more constraints at 1102.

The method can entail obtaining an individual radio white space frequency and associated individual constraints at 1104.

The method can include utilizing the individual radio white space frequency for network access independent from the wireless device that is configured to obtain the authorization at 1106.

Fourth Method Example

Figure 12:
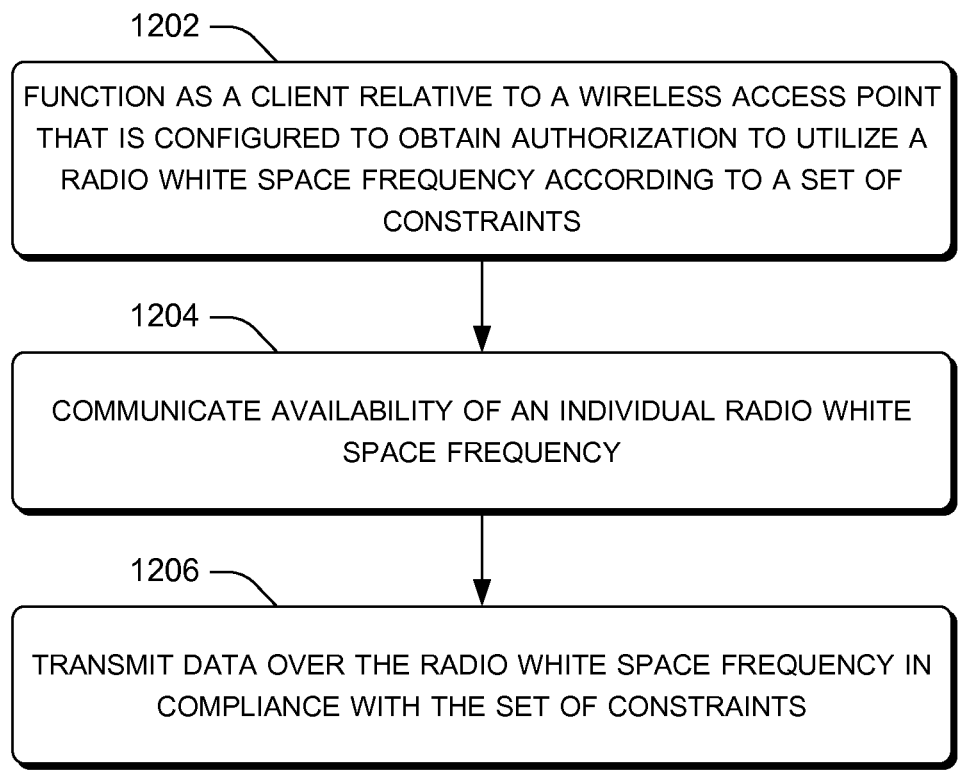

FIG. 12 shows a method 1200 for utilization of radio white space frequencies.

The method can include functioning as a client relative to a wireless access point that is configured to obtain authorization to utilize a radio white space frequency according to a set of constraints at 1202.

The method can entail communicating availability of an individual radio white space frequency at 1204.

The method can include transmitting data over the radio white space frequency in compliance with the set of constraints at 1206.

Fifth Method Example

Figure 13:
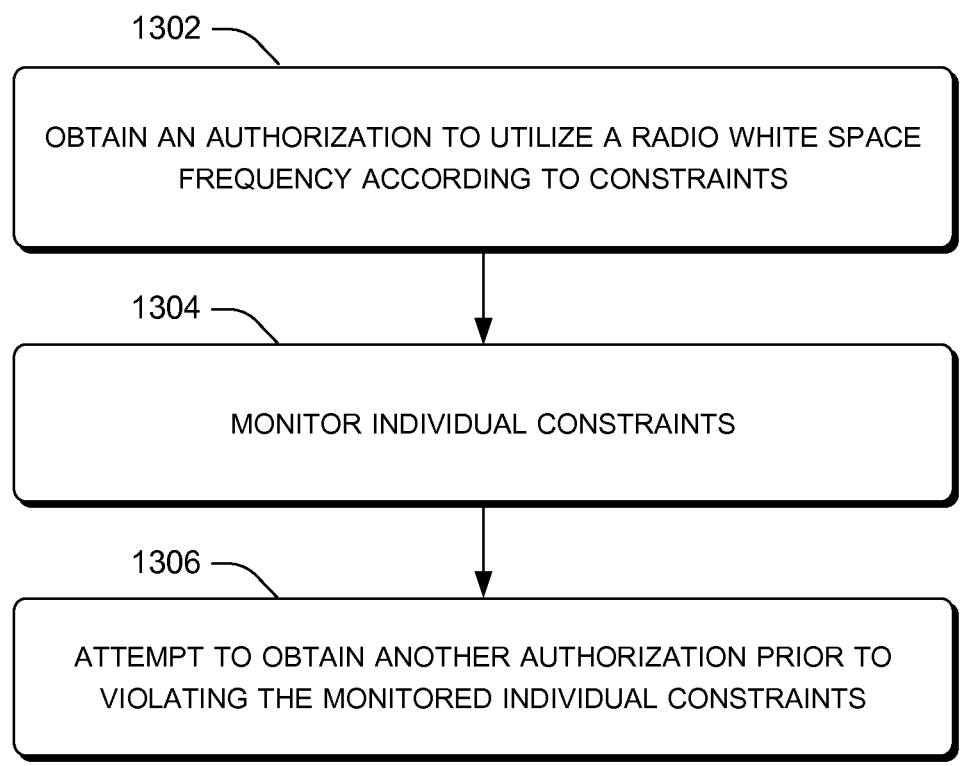

FIG. 13 shows a method 1300 for utilization of radio white space frequencies.

The method can include obtaining an authorization to utilize a radio white space frequency according to constraints at 1302.

The method can entail monitoring individual constraints at 1304. In one case, the monitoring can entail monitoring a time constraint and/or a location constraint, among others.

The method can include attempting to obtain another authorization prior to violating the monitored individual constraints at 1306.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

CONCLUSION

Although techniques, methods, devices, systems, etc., pertaining to utilization of radio white space frequencies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A wireless device, comprising:
memory and a processor configured to execute instructions stored on the memory; and
a communication component,
the wireless device lacking inherent self-locating capability and lacking cellular Internet communication capability,
the communication component being configured to:
use short-range wireless communication to send, to a mobile device having inherent self-locating capability and cellular Internet communication capability, a request that the mobile device obtain authorization to use one or more authorized radio white space frequencies at a location of the mobile device, the authorization being obtained by the mobile device using the cellular Internet communication capability and limited by an associated distance constraint specifying a transmission radius from the location of the mobile device;
monitor relative distance of the wireless device from the mobile device based at least upon success or failure of short-range wireless transmissions from the wireless device to the mobile device;
based at least on the relative distance of the wireless device from the mobile device, determine a transmission power for the wireless device to transmit on an individual authorized radio white space frequency while complying with the distance constraint; and
utilize the individual authorized radio white space frequency at the determined transmission power for network connectivity with another wireless device other than the mobile device.

2. The wireless device of claim 1, wherein the wireless device further comprises a transmitter configured to transmit at least one of 2.4 Giga Hertz frequency, 5.0 Giga Hertz frequency, TV channel frequencies, or 60 Giga Hertz frequency.

3. The wireless device of claim 1, wherein the authorization is associated with a duration constraint and wherein the communication component is further configured to track use of the individual authorized radio white space frequency relative to the duration constraint to ensure that the duration constraint is not exceeded.

4. A system comprising the wireless device of claim 1 and the mobile device.

5. A system comprising the wireless device of claim 1, the mobile device, and the another wireless device.

6. A wireless device comprising:
a processor; and one or more computer-readable storage media,
the wireless device lacking inherent self-locating capability and lacking cellular Internet communication capability,
the computer-readable storage media storing computer-readable instructions that, when executed by the processor, cause the processor to:
use short-range wireless communication to contact a mobile device having self-locating capability and cellular Internet communication capability to obtain an authorization to utilize a radio white space frequency, the authorization being limited by an associated distance constraint relative to a location of the mobile device;
monitor relative distance between the wireless device and the mobile device based at least upon success or failure of short-range wireless transmissions from the wireless device to the mobile device;
based at least on the relative distance of the wireless device from the mobile device, determine a transmission power for the wireless device to transmit on the radio white space frequency, while complying with the distance constraint; and
use the radio white space frequency at the determined transmission power for communication with a further wireless device other than the mobile device from which the authorization was obtained.

7. The wireless device of claim 6, wherein the computer-readable instructions, when executed by the processor, cause the processor to:
select the transmission power so that a transmission range of the wireless device does not exceed the distance constraint as measured from the location of the mobile device from which the authorization is obtained.

8. The wireless device of claim 6, wherein the computer-readable instructions that, when executed by the processor, cause the processor to:
obtain, via the short-range wireless communication and from the mobile device, a duration constraint associated with the authorization;
after a first specified period of time and prior to expiration of the duration constraint, use the short-range wireless communication for a first attempt to re-authorize use of the radio white space frequency; and
after a second specified period of time after the first specified period of time and prior to expiration of the duration constraint, use the short-range wireless communication for a second attempt to re-authorize use of the radio white space frequency,
the second specified period of time being relatively shorter in duration than the first specified period of time.

9. The wireless device of claim 8, comprising multiple processors.

10. The wireless device of claim 8, wherein the radio white space frequency is used to transmit video data to the further wireless device.

11. The wireless device of claim 10, wherein the computer-readable instructions, when executed by the processor, cause the processor to:
determine a first radius centered at the mobile device, the first radius being based at least on the associated distance constraint;
determine a second radius centered at the wireless device, the second radius being based at least on the determined transmission power; and confirm that the second radius centered at the wireless device falls completely within the first radius centered at the mobile device before transmitting on the radio white space frequency.

12. The wireless device of claim 11, embodied as a video camera, wherein the mobile device is a mobile phone and the further wireless device is a display.

13. A system comprising the video camera, the mobile device, and the display of claim 12.

14. A method comprising:
causing a first wireless device that lacks inherent self-locating capability and that lacks cellular Internet communication capability to use short-range wireless communication to obtain an authorization to use a radio white space frequency from a mobile device, wherein the mobile device has self-locating ability and obtains the authorization via cellular Internet communication, the authorization being for use of the radio white space frequency at a mobile device location of the mobile device;
causing the first wireless device to receive, from the mobile device, a distance constraint that limits transmissions at the radio white space frequency to a designated radius around the mobile device location and a duration constraint indicating an expiration time for the authorization;
causing the first wireless device to determine a relative distance between the first wireless device and the mobile device based at least upon success or failure of short-range wireless transmissions from the first wireless device to the mobile device;
causing the first wireless device to determine a transmission power of the radio white space frequency that, when transmitted from the location of the first wireless device, will not exceed the designated radius around the mobile device location;
causing the first wireless device to send, to a second wireless device, the radio white space frequency received from the mobile device;
causing the first wireless device to transmit data to the second wireless device on the radio white space frequency at the determined transmission power; and
as the expiration time approaches, causing the first wireless device to use the short-range wireless communication to continue requesting an additional authorization at progressively shorter time intervals.

15. The method of claim 14, wherein:
the distance constraint limits transmissions at the radio white space frequency to a designated radius of 1000 meters around the mobile device location,
the relative distance between the first wireless device and the mobile device is 100 meters,
the transmission power is selected to be detectable within a range of 500 meters from the first wireless device, and
the transmission power is not detectable at greater than 600 meters from the mobile device.

16. The method of claim 14, wherein the short-range wireless transmissions used to monitor the relative distance and the short-range wireless communication used to obtain the authorization are performed at a range of 10 meters or less.

17. The method of claim 16, wherein the short-range wireless communication and the short-range wireless transmissions are Bluetooth compliant.

18. The method of claim 16, wherein the short-range wireless transmissions used to monitor the relative distance and the short-range wireless communication used to obtain the authorization are performed at 2.5 milliwatts.

19. The method of claim 16, wherein the short-range wireless transmissions used to monitor the relative distance and the short-range wireless communication used to obtain the authorization are performed at 4 dBm.

20. The method of claim 14, wherein the data is transmitted from the first wireless device to the second wireless device without using the mobile device as an intermediary.

* * * * *